United States Patent Office

3,641,238
Patented Feb. 8, 1972

3,641,238
STABLE DENTAL CREAM COMPOSITION
Joseph Paul Januszewski, Somerville, and Tayseer George Bahouth, Piscataway, N.J., assignors to Colgate-Palmolive Company, New York, N.Y.
No Drawing. Filed Apr. 21, 1969, Ser. No. 818,084
Int. Cl. A61r 7/16
U.S. Cl. 424—49
6 Claims

ABSTRACT OF THE DISCLOSURE

Dental cream containing polishing agent, benzyl alcohol, and oil of cloves flavor. Ethyl alcohol is present to stabilize the cream and to prevent separation of the cream.

---

This invention relates to a dental cream composition. More particularly, it relates to a dental cream which promotes oral hygiene and possesses the cosmetically desirable flavor of oil of cloves. The cream can be facilely applied to tender areas of the gums.

In the oral cavity of mammals, the gums are often very tender; and it is difficult or painful to cleanse them properly with a dental cream.

It is, therefore, desirable to provide a dental cream containing an agent which has a mild desentitizing effect on the gums, such as benzyl alcohol, to permit facile cleansing of tender areas of the oral cavity. Oil of cloves has been found to be a particularly desirable flavor for such a dental cream. However, dental creams containing benzyl alcohol in amounts sufficient to desensitize the gums and such flavor tends to separate into liquid and solid phases.

It is an object of this invention to provide a dental cream containing benzyl alcohol which is storage stable even in the presence of oil of cloves.

Other objects will be apparent from consideration of the following disclosure.

In accordance with certain of its aspects, this invention relates to a dental cream comprising a substantially water-insoluble polishing agent, oil of cloves flavoring material, benzyl alcohol, and ethyl alcohol.

The instant compositions normally have a pH between about 3.5 and 10, and preferably on the order of about 6–9, and preferably about 6.5. Suitably a buffering system may be employed to assure maintenance of a pH within the aforesaid range in order to insure against a reduction in activity of the composition which occurs under more alkaline or acidic conditions.

Any suitable substantially water-insoluble polishing agent may be employed in the preparation of dentifrice compositions, such as toothpaste, powders, creams and the like, in accordance with the present invention. There is a relatively large number of such materials known in the art. Representative materials include, for example, dicalcium phosphate, tricalcium phosphate, insoluble sodium metaphosphate, aluminum hydroxide, polymethyl methacrylate, magnesium carbonate, calcium carbonate, calcium pyrophosphate, calcium sulfate, bentonite, etc., including suitable mixtures thereof. It is preferred to use the water-insoluble phosphate salts as the polishing agents and, more particularly, insoluble sodium metaphosphate and/or a calcium phosphate, such as dicalcium phosphate dihydrate. Aluminum hydroxide, or hydrated alumina, may also be used in accordance with certain preferred aspects of the invention.

The polishing agent content is variable, but will generally be up to about 75% by weight of the total composition, typically about 20–75%.

Oil of cloves is a material which contributes a cosmetically desirable flavor to the dental cream of the invention. It is typically employed in the dental cream in amount of about 0.5–5% by weight, preferably about 1–3%, and most preferably about 1–2%.

Benzyl alcohol is incorporated into the dental cream to effect mild desensitization of tender membranes in the oral cavity. It is generally employed in amounts of about 0.5–10% by weight, preferably about 0.75–3.5% and most preferably about 1.0–2.0%.

Ethyl alcohol is employed to prevent the separation of the components of the dental cream into liquid and solid materials. Typically, ethyl alcohol is employed as 95% ethyl alcohol in water. When ethyl alcohol is not employed, the dental cream has poor storage stability and separates into liquid and solid components in a short time, say, less than 24 hours.

Ethyl alcohol is employed in the dental cream in amounts of about 0.5–3% by weight, preferably about 1–2%. The benzyl alcohol is dissolved in the ethyl alcohol prior to mixture with other components of the dental cream.

When the polishing agent employed in the dental cream of the instant invention is hydrated alumina, it is particularly desirable to also include an astringent, such as zinc sulfate, zinc chloride, aluminum chloride and the like, in the cream. Typically, the astringent is present in amount of about 0.25–3% by weight, preferably 0.5–1%. The astringent may also be employed with polishing agents other than hydrated alumina, such as calcium carbonate.

An agent which has a desensitizing effect on tender areas and membranes of the oral cavity may be present in addition to benzyl alcohol. A typical example of such an agent is Benzocaine, ethyl p-amino benzoate, which may be present in the dental cream in amount of about 0.1–3% by weight, preferably 0.15–2%.

In a dental cream formulation, liquids and solids are proportioned to form a creamy mass of desired consistency. The creamy mass prepared in accordance with the instant invention is typically incorporated into a collapsible dentifrice tube.

In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20–75% by weight of the formulation. It is preferred to use also a gelling agent in dental creams such as the natural and synthetic gums and gum-like materials, e.g., Irish moss, gum tragacanth, sodium carboxymethyl cellulose, polyvinylpyrrolidone, starch and the like, usually in an amount up to about 10%, and preferably about 0.2–5% of the formulation. When an astringent is employed, the preferred gum is Irish moss.

Organic surface-active agents used in the compositions of the present invention may co-act with the antimicrobial agent to achieve increased prophylactic action, assist in achieving thorough and complete dispersion of the instant compositions throughout the oral cavity, and render the instant compositions more cosmetically acceptable. The organic surface active material may be anionic, nonionic, ampholytic, or cationic in nature, and it is preferred to employ as the surface active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkylsulfoacetates, higher fatty acid ester of 1,2-dihydroxy propane sulfonates, and the substantially saturated higher aliphatic acyl amides of lower aliphatic amino carboxylic acid compounds, such as those having 12 to 16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl or N-palmitoyl sarcosinates, which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid in the oral cavity due to carbohydrates, in addition to exerting some reduction in the solubility of tooth enamel in acid solutions.

Other suitable surface active materials include nonionic agents such as condensates of sorbitan monostearate with approximately 60 moles of ethylene oxide, condensates of ethylene oxide with propylene oxide condensates of propylene glycol ("Pluronics") and cationic surface active germicides and antibacterial compounds such as di-isobutylphenoxyethoxyethyl dimethyl benzyl ammonium chloride, benzyl dimethyl stearyl ammonium chloride, tertiary amines having one fatty alkyl group (of from 12 to 18 carbon atoms) and two (poly) oxyethylene groups attached to the nitrogen (typically containing a total of from about 2 to 50 ethenoxy groups per molecule) and salts thereof with acids, and compounds of the structure

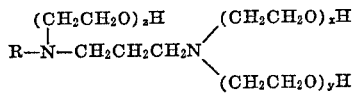

where R is a fatty alkyl group containing from about 12 to 18 carbon atoms, and $x$, $y$ and $z$ total 3 or higher, as well as salts thereof with mineral or organic acids.

It is preferred to use from 0.05 to 5% by weight of the foregoing surface-active materials in the instant dental creams.

Various other materials may be incorporated in the dental creams of this invention. Examples thereof are coloring or whitening agents, preservatives, silicones, chlorophyll compounds, ammoniated materials such as urea, diammoniumphosphate and mixtures thereof, and other constituents. These adjuvants are incorporated in the instant compositions in amounts which do not substantially adversely affect the properties and characteristics suitably selected and used in proper amount depending upon the particular type of preparation involved.

Antibacterial agents may also be employed in the dental creams of the instant invention. Typical antibacterial agents include $N^1$-(4-chlorobenzyl)-$N^5$-(2,4-dichlorobenzyl)biguanide;
p-chlorophenyl biguanide;
4-chlorobenzhydryl biguanide;
4-chlorobenzhydrylguanylurea;
N-3-lauroxpropyl-$N^5$-p-chlorobenxylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis(2-ethylhexyl)-5-methylhexahydropyrimidine;

and their non-toxic acid addition salts.

The antibacterial agent, when present, is employed in amounts of about 0.01–5% by weight, preferably about 0.05–5%.

In addition to oil of cloves, the taste of the dental cream may be modified by employing sweeter or an additional flavoring sialagogue. Suitable sweeteners include sucrose, lactose, maltose, sorbitol, sodium cyclamate and saccharine. Suitable additional flavors include flavoring oils such as oils of spearmint, peppermine, wintergreen, sassafras, sage, eucalyptus, marjoram, cinnamon, lemon and orange, as well as sodium methylsalicylate. Typically, this total amount of sialagogue flavor, including oil of cloves is about 0.5–6% or more by weight.

The compositions of the present invention suitably may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2 \cdot KF$), sodium hexafluorostannate, stannous chlorofluoride, sodium fluorozirconate, and sodium monofluorophosphate. These materials, which dissociate or release fluorine-containing ions in water, suitably may be present in an effective but non-toxic amount, usually within the range of about 0.01 to 1% by weight of the water soluble fluorine content thereof.

The following specific examples are further illustrative of the nature of the present invention but it is to be understood that the invention is not limited thereto. All amounts and proportions are by weight unless otherwise indicated.

EXAMPLE I

The following dental creams are prepared:

| | Parts |
|---|---|
| Glycerine | 22.00 |
| Irish moss | 1.00 |
| Sodium saccharine | 0.20 |
| Sodium benzoate | 0.50 |
| Water (distilled) | 17.50 |
| Zinc sulfate | 0.60 |
| Sodium lauryl sulfate | 1.50 |
| Hydrated alumina | 52.00 |
| Benzyl alcohol | 1.50 |
| Ethyl alcohol (95%) | 2.00 |
| Oil of cloves | 1.20 |

This formulation is prepared by adding a solution of benzyl alcohol in ethyl alcohol (95%) to a gel containing glycerine, Irish moss, sodium saccharine, sodium benzoate, water, zinc sulfate and sodium lauryl sulfate. The polishing agent (hydrated alumina) is then added to form a cream. Oil of cloves flavor is then added. The cream is incorporated into toothpaste tubes and remains stable on storage even after several months.

The cream of this example is easily applied in the oral cavity even to tender areas of the gums, and effectively cleanses the oral cavity, including such tender areas.

When it is attempted to prepare the same dental cream, except for the omission of ethyl alcohol, the cream quickly separates into liquid and solid phases.

EXAMPLE II

The following dental cream is prepared in a manner similar to that described in Example I.

| | Parts |
|---|---|
| Glycerine | 22.00 |
| Irish moss | 1.00 |
| Sodium benzoate | 0.50 |
| Sodium saccharine | 0.20 |
| Water | 19.10 |
| Sodium lauryl sulfate | 1.50 |
| Calcium carbonate | 52.00 |
| Benzyl alcohol | 1.50 |
| Ethyl alcohol | 1.00 |
| Oil of cloves | 1.20 |

This cream retains desirable thickness for a long period of time while the same cream from which ethyl alcohol is omitted quickly separates into liquid and solid phases.

The cream of this example is easily applied in the oral cavity, even to tender areas of the gums, and effectively cleanses the oral cavity, including such tender areas.

EXAMPLE III

The following dental cream is prepared in a manner similar to that considered in Example I, the ethyl p-amino benzoate being added after the alumina polishing agent.

| | Parts |
|---|---|
| Glycerine | 22.00 |
| Irish moss | 0.80 |
| Sodium benzoate | 0.50 |
| Sodium saccharine | 0.20 |
| Water | 18.40 |
| Zinc sulfate | 0.60 |
| Sodium lauryl sulfate | 1.50 |
| Hydrated alumina | 52.00 |
| Ethyl p-amino benzoate | 0.50 |
| benzyl alcohol | 0.80 |
| Ethyl alcohol (95%) | 1.50 |
| Oil of cloves | 1.20 |

This cream retains desirable thickness for a long period of time while the same cream from which ethyl alcohol is omitted quickly separates into liquid and solid phases.

The cream of this example is easily applied in the oral cavity, even to tender areas of the gums, and effectively cleanses the oral cavity, including such tender areas.

It will be apparent to one skilled in the art that various modifications may be made and equivalents can be substituted therefor.

What is claimed is:

1. A dental cream comprising a dentally acceptable substantially water-insoluble polishing agent, flavoring material, including about 0.5-5% by weight of oil of cloves about 0.5-10% weight of benzyl alcohol and about 0.5-3% by weight of ethyl alcohol.

2. The dental cream of claim 1 wherein said dental cream also contains about 0.1-3% by weight of ethyl p-amino benzoate.

3. The dental cream of claim 1 wherein said substantially water-insoluble polishing agent contains hydrated alumina.

4. The dental cream of claim 3 wherein said dental cream also contains about 0.2-3% by weight of an astringent.

5. The dental cream of claim 4 wherein said astringent is zinc sulfate.

6. A process for improving oral hygiene which comprises applying to the oral cavity a dental cream comprising a dentally acceptable substantially water-insoluble polishing agent, flavoring material including about 0.5-5% by weight of oil of cloves, about 0.5-10% by weight of benzyl alcohol and about 0.5-3% by weight of ethyl alcohol.

References Cited

UNITED STATES PATENTS

| | | | |
|---|---|---|---|
| 1,551,638 | 9/1925 | Brady | 424—58 |
| 2,744,049 | 5/1956 | Salzmann et al. | 424—49 |
| 3,003,919 | 10/1961 | Broge | 424—49 |

OTHER REFERENCES

The Dispensatory of the United States of America, 25th ed., published by J. B. Lippincott Co., Philadelphia, 1955, p. 159.

RICHARD L. HUFF, Primary Examiner